(12) United States Patent
Faraj et al.

(10) Patent No.: US 12,526,042 B2
(45) Date of Patent: Jan. 13, 2026

(54) FIBER ELEMENT OFFSET LENGTH-BASED OPTICAL REFLECTOR PEAK ANALYSIS

(71) Applicant: VIAVI SOLUTIONS INC., Chandler, AZ (US)

(72) Inventors: Patrick Faraj, Berlin (DE); Philippe Chapon, Chamboeuf (FR); Thomas Ronan, Chertsey (GB); Jonathan Setiawan, Singapore (SG)

(73) Assignee: VIAVI SOLUTIONS INC., Chandler, AZ (US)

( * ) Notice: Subject to any disclaimer, the term of this patent is extended or adjusted under 35 U.S.C. 154(b) by 284 days.

(21) Appl. No.: 17/943,594

(22) Filed: Sep. 13, 2022

(65) Prior Publication Data
US 2023/0084406 A1    Mar. 16, 2023

(30) Foreign Application Priority Data
Sep. 14, 2021 (EP) .................... 21306267

(51) Int. Cl.
*H04B 10/071* (2013.01)
*G01M 11/00* (2006.01)

(52) U.S. Cl.
CPC ....... *H04B 10/071* (2013.01); *G01M 11/3136* (2013.01); *G01M 11/3145* (2013.01)

(58) Field of Classification Search
CPC ............ H04B 10/071; G01M 11/3136; G01M 11/3145; G01M 11/3109; G01M 11/085; G01M 11/086
See application file for complete search history.

(56) References Cited

U.S. PATENT DOCUMENTS

| | | | | |
|---|---|---|---|---|
| 5,187,362 | A * | 2/1993 | Keeble | H04B 10/071 356/73.1 |
| 6,396,575 | B1 * | 5/2002 | Holland | G01M 11/3181 356/73.1 |
| 7,808,621 | B2 * | 10/2010 | Russell | G02B 6/4482 356/73.1 |
| 9,240,836 | B1 * | 1/2016 | Chen | G01M 11/3136 |
| 10,161,829 | B2 * | 12/2018 | Brillhart | H04B 10/07955 |

(Continued)

FOREIGN PATENT DOCUMENTS

WO    WO-9006498 A2 * 6/1990
WO    WO-2008116309 A1 * 10/2008    .......... H04B 10/071

(Continued)

OTHER PUBLICATIONS

English Machine translation of WO-2021098341-A1 (Year: 2021).*

*Primary Examiner* — Dominic J Bologna
(74) *Attorney, Agent, or Firm* — Mannava & Kang, P.C.

(57) ABSTRACT

According to examples, a fiber element offset length-based optical reflector peak analysis apparatus may include an optical element optically connected to a laser source that emits a laser beam. The optical element may include a pre-set offset length between a plurality of adjacent branches. The fiber element offset length-based optical reflector peak analysis apparatus may further include an optical time-domain reflectometer (OTDR) to generate, based on optical reflection signals received from corresponding optical reflectors attached to devices under test (DUTs) that are attached to the plurality of adjacent branches, an OTDR trace that qualifies each of the DUTs.

19 Claims, 13 Drawing Sheets

(56) References Cited

U.S. PATENT DOCUMENTS

| | | | |
|---|---|---|---|
| 2007/0025676 A1 | 2/2007 | Russell | |
| 2009/0268197 A1* | 10/2009 | Perron | G01M 11/3136 356/73.1 |
| 2014/0193147 A1* | 7/2014 | Smith | H04B 10/071 398/16 |
| 2016/0043798 A1* | 2/2016 | Chen | G01M 11/3136 398/21 |
| 2016/0191163 A1* | 6/2016 | Preston | G01L 1/242 398/16 |
| 2019/0028190 A1* | 1/2019 | Hou | H04B 10/27 |

FOREIGN PATENT DOCUMENTS

| | | | | |
|---|---|---|---|---|
| WO | WO-2016033192 A1 * | 3/2016 | | G01B 11/161 |
| WO | WO-2021098341 A1 * | 5/2021 | | H04B 10/079 |

\* cited by examiner

US 12,526,042 B2
1

FIBER ELEMENT OFFSET LENGTH-BASED OPTICAL REFLECTOR PEAK ANALYSIS

PRIORITY

The present application claims priority under 35 U.S.C. 119(a)-(d) to European Patent Application No. 21306267.2, having a filing date of Sep. 14, 2021, the disclosure of which is hereby incorporated by reference in its entirety.

BACKGROUND

An optical time-domain reflectometer (OTDR) is an opto-electronic instrument used to characterize an optical fiber. The OTDR may inject a series of optical pulses into an optical fiber under test. Based on the injected optical pulses, the OTDR may extract, from the same end of the optical fiber in which the optical pulses are injected, light that is scattered or reflected back from points along the optical fiber. The scattered or reflected light that is gathered back may be used to characterize the optical fiber. For example, the scattered or reflected light that is gathered back may be used to detect, locate, and measure events at any location of the optical fiber. The events may include faults at any location of the optical fiber. Other types of features that may be measured by the OTDR include attenuation uniformity and attenuation rate, segment length, and location and insertion loss of connectors and splices.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1A:
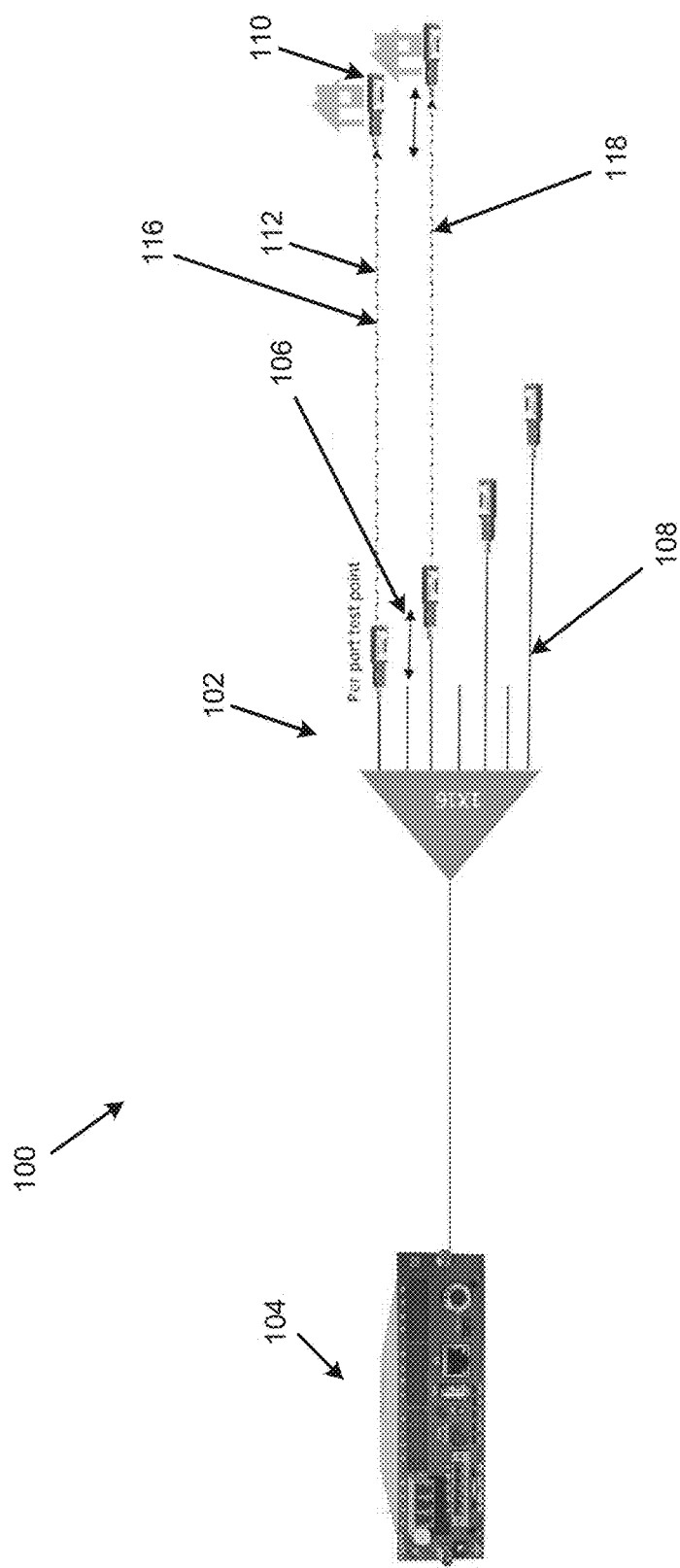
FIG. 1A illustrates an architecture of a fiber element offset length-based optical reflector peak analysis apparatus, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to examples of the present disclosure, fiber element offset length-based optical reflector peak analysis apparatuses and methods for fiber element offset length-based optical reflector peak analysis are disclosed herein, and provide for implementation of an automated centralized fiber test process using fiber element offset length to enable optical reflector peak identification in an equidistant fiber termination drop environment. The apparatuses and methods disclosed herein may detect reflector peaks, certify, and establish a baseline during build to the last connectivity point in a fiber network where the fiber drop connections to the last termination are equidistant. The apparatuses and methods disclosed herein may utilize an optical element with a pre-set (e.g., controlled) offset length between all n-number of adjacent branches or ports (e.g., staggered optical splitter legs by 5 cm, 10 cm, 50 cm, or another value) to identify, by an optical time-domain reflectometer (OTDR) of a specified resolution, splitter legs in an OTDR trace as peaks in the OTDR trace. For example, for an n-fiber configuration, each of the legs of the staggered leg splitter may be staggered by a value such as 5 cm, 10 cm, etc., so that the splitter terminal connections are similarly staggered. In this regard, instead of the staggered leg splitter, a distribution point or distribution terminal may be utilized for the apparatuses and methods disclosed herein.

With respect to optical fiber testing generally, for an equidistant fiber drop connection, peak reflection from n-number of branches and/or ports of the termination points may be overlaid, and may be undetectable and unidentifiable. This may make it technically challenging for a centralized fiber test system, such as an OTDR, to automatically qualify the n-number of branches and/or ports in a network, such as a passive optical network (PON) network. For example, whereas a single branch of a last demarcation element may be qualified, and peak reflection baselines for this branch may be established, it is technically challenging to identify, qualify, and monitor any adjacent last mile drops on the physical layer. Yet further, with respect to qualification of equidistant n-number of branches of an optical element, a reflector may need to be shifted multiple times based on the number of ports to qualify each branch separately at the test point. Since the branches are equidistant, it may not possible to leave the reflectors in the original place to see or monitor the reflections on n-number of branches and/or ports (e.g., one branch and/or port may be monitored at one time). Yet further, it is technically challenging to remotely identify the optical termination branch and/or port that the drop fiber has been connected to in order to activate an end of line connection.

The apparatuses and methods disclosed herein address at least the aforementioned technical challenges by implementing an optical element with a pre-set (e.g., controlled) offset length between all n-number of adjacent branches or ports.

According to examples disclosed herein, an optical reflector element may be attached to all n-number of branches to generate an optical signal reflection.

According to examples disclosed herein, the apparatuses and methods disclosed herein may include a centralized optical test head using an ultra-high resolution OTDR to minimize offset lengths corresponding to the OTDR peak resolution. These aspects may reduce the impact of offset length on size of the terminal and optical loss penalty impacts.

According to examples disclosed herein, the apparatuses and methods disclosed herein may include management of automatic peak identification, tagging (e.g., naming), and re-association to enable the qualification and monitoring process of last mile installs.

According to examples disclosed herein, the apparatuses and methods disclosed herein may provide for automatic detection, based on the aforementioned induced offset, of n-number of branches and/or ports terminated with a reflector in a single measurement. In this regard, instead of having to qualify each optical fiber in a network separately (e.g., if the end of line drop points are equidistant), a single OTDR measurement may be performed to qualify all optical fibers (e.g., n-number of optical fibers) that include optical reflectors.

According to examples disclosed herein, for the apparatuses and methods disclosed herein, during an end of line drop connection process, an installer may move a reflector from one selected branch and/or port, and install the reflector at the end of line termination point.

According to examples disclosed herein, for the apparatuses and methods disclosed herein, one additional OTDR measurement may enable automatic detection of the removed peak at the particular branch, and re-associate it to the new peak appearing at the end of line termination point. These aspects may enable automatic remote identification and certification of port occupancy and availability.

According to examples disclosed herein, for the apparatuses and methods disclosed herein, since the end of line drop points may be equidistant, the offset peak generation may enable continuous end-to-end monitoring of all coexisting n-number of end of line terminations.

According to examples disclosed herein, the apparatuses and methods disclosed herein may provide for reduction of costs for installers to qualify n-number of branches and/or ports separately based on a single measurement approach as disclosed herein.

According to examples disclosed herein, the apparatuses and methods disclosed herein may provide for full visibility of n-number of branches and/or port statuses that include, for example, optical health, port occupancy, and port availability, thus providing the insight for planning upgrades and additional build out of elements.

According to examples disclosed herein, the apparatuses and methods disclosed herein may provide for the full end-to-end monitoring in an equidistant last mile drop connections environment.

According to examples disclosed herein, the apparatuses and methods disclosed herein may provide for a simplified centralized test process for activation.

FIG. 1A illustrates an architecture of a fiber element offset length-based optical reflector peak analysis apparatus (hereinafter referred to as "apparatus 100"), according to an example of the present disclosure.

Referring to FIG. 1A, the apparatus 100 may include an optical element 102 optically connected to a laser source (e.g., of OTDR 104) that emits a laser beam. The optical element 102 may include a pre-set offset length 106 between a plurality of adjacent branches 108. According to examples disclosed herein, the optical element 102 may include a staggered leg splitter (e.g., staggered, for example, by 5 cm, 10 cm, 50 cm, or another value) to identify, by the OTDR 104 of a specified resolution, splitter legs in an OTDR trace as peaks in the OTDR trace.

The apparatus 100 may further include the OTDR 104 to generate, based on optical reflection signals received from corresponding optical reflectors 110 attached to devices under test (DUTs) 112 that are attached to the plurality of adjacent branches 108, an OTDR trace 114 (e.g., see FIG. 6) that qualifies each of the DUTs 112.

According to examples disclosed herein, the DUTs 112 may include optical fibers.

According to examples disclosed herein, the pre-set offset length may be based on a resolution of the OTDR 104. For example, the pre-set offset length may be greater than the resolution of the OTDR 104. For example, assuming that the resolution of the OTDR 104 is 30 cm, in this regard, the preset offset length may be specified at 50 cm.

According to examples disclosed herein, as shown in FIG. 1A, fiber drop connections to a last termination associated with the DUTs 112 may be equidistant. For example, as shown in FIG. 1A, based on the offset shown, the fiber drop connections to a last termination associated with the DUTs 116 and 118 are equidistant.

According to examples disclosed herein, the OTDR trace 114 may be qualified by identifying, in the OTDR trace 114, at least one peak (e.g., see peaks 600 and 602 of FIG. 6) corresponding to the at least one optical reflector. In this regard, the number of peaks expected in the OTDR trace 114 may be equal to the number of DUTs 112 (or corresponding optical reflectors). Thus, in the event a number of peaks in the OTDR trace 114 is less than the number of DUTs 112, the DUTs may be separately analyzed, or otherwise, an offset value associated with the optical element 102 may be changed to separate the peaks.

According to examples disclosed herein, a network associated with qualification of the at least one DUT may include a passive optical network (PON) network.

According to examples disclosed herein, qualifying the at least one DUT may include identifying the at least one DUT.

According to examples disclosed herein, the pre-set offset length between the plurality of adjacent branches may be uniform. In this regard, the pre-set offset length between the plurality of adjacent branches may be specified as being uniform such that the fiber drop connections to a last termination associated with the DUTs are equidistant.

According to examples disclosed herein, the pre-set offset length between the plurality of adjacent branches may be variable. In this regard, the pre-set offset length between the plurality of adjacent branches may be specified as being variable such that the fiber drop connections to a last termination associated with the DUTs are equidistant.

According to examples disclosed herein, the OTDR 104 may generate, based on at least one optical reflection signal received from at least one corresponding optical reflector attached to at least one DUT of a plurality of DUTs 112 that are attached to the plurality of adjacent branches, an OTDR trace (e.g., see OTDR trace 114 of FIG. 6) that qualifies the at least one DUT.

FIGS. 1B-1E illustrate examples of optical elements for the apparatus 100, according to an example of the present disclosure.

Generally, the examples of FIGS. 1B-1E describe a fiber element offset length-based optical reflector peak analysis apparatus including an optical element optically connected to a laser source that emits a laser beam. The optical element may include a splice tray that includes DUTs attached to a plurality of adjacent branches (e.g., FIG. 1B), a connected cable stub that includes DUT pigtails for the DUTs (e.g., FIG. 1C), an optical splitter that includes that DUTs (e.g., FIG. 1D), or a test fanout that includes staggered outputs (e.g., FIG. 1E). In this regard, an OTDR may generate, based on optical reflection signals received from corresponding optical reflectors attached to the DUTs that are attached to the optical element, an OTDR trace that qualifies each of the DUTs.

Figure 1B:
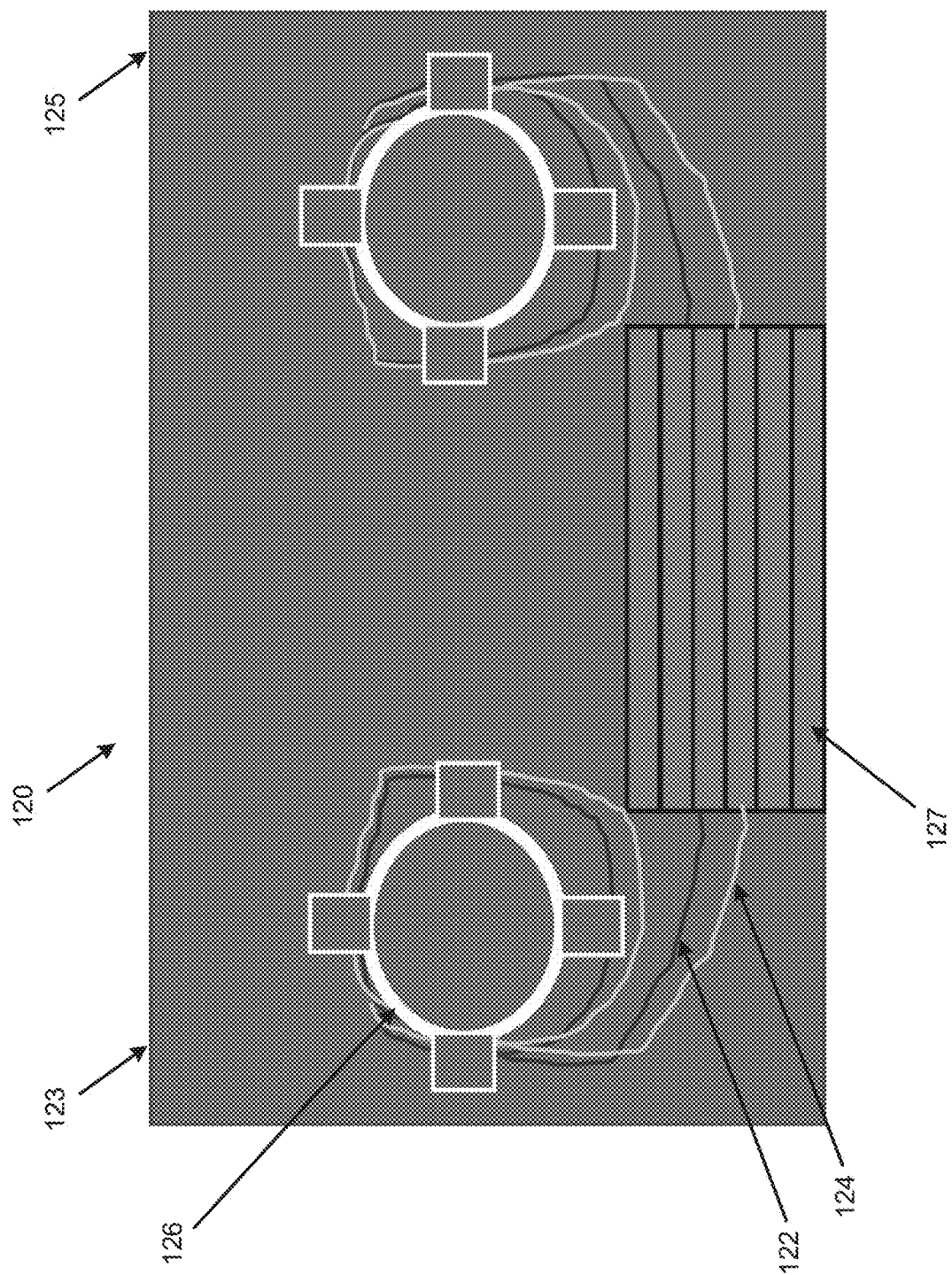
FIGS. 1B-1E illustrate examples of optical elements for the fiber element offset length-based optical reflector peak analysis apparatus of FIG. 1A, according to an example of the present disclosure.

Specifically, referring to FIG. 1B, in one example, the optical element 102 may include optical fibers spliced in a splice tray as shown at 120. In this regard, a length of fiber 1 (e.g., at 122) may be greater than a length of fiber 2 (e.g., at 124), for example, by 50 cm, with the additional length being stored around the round drum 126. The fibers at 122 and 124 may be connected to a splice holder 127. Further, the fibers at 122 and 124 may exit the splice tray, for example, at 123 and 125.

Figure 1C:
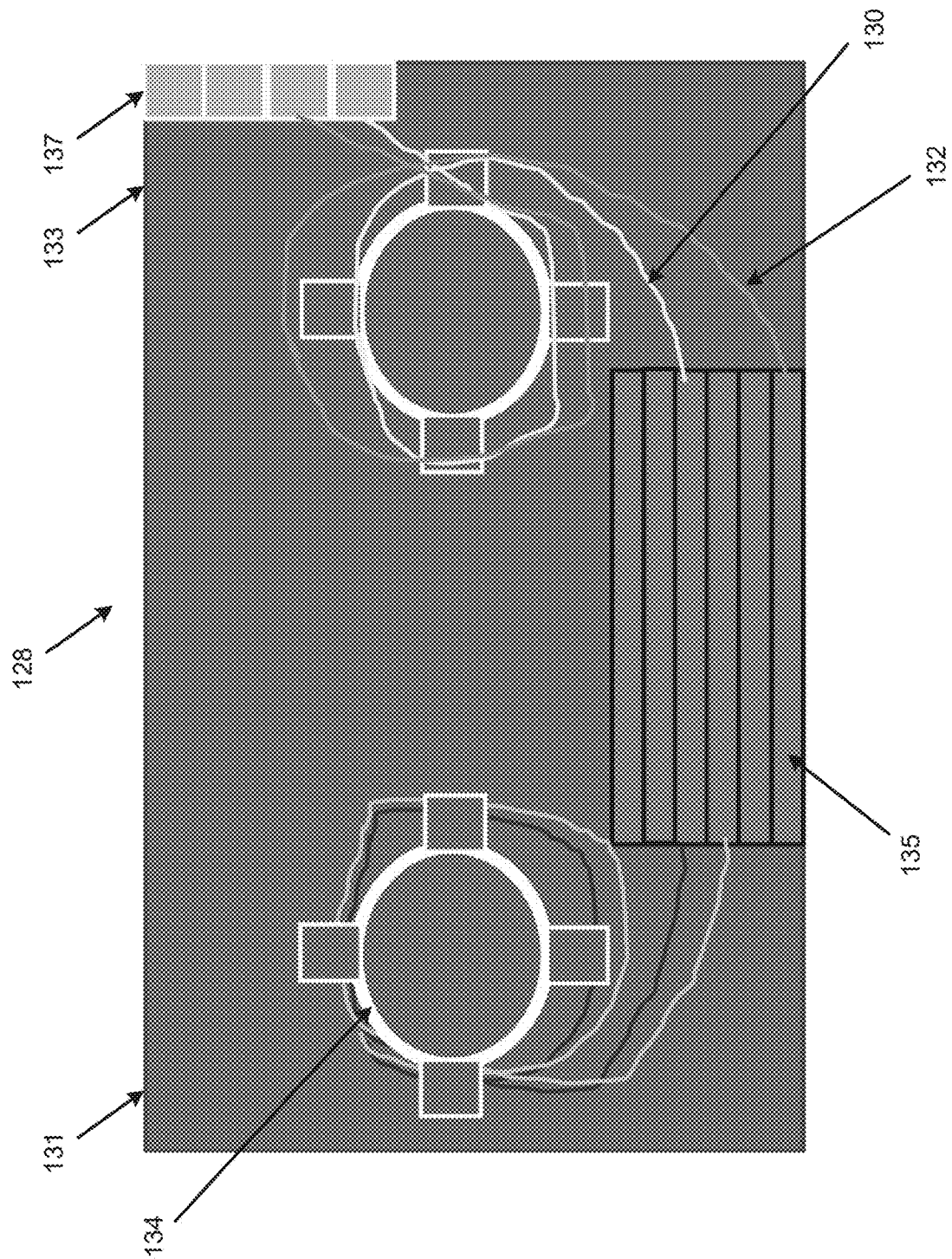

Referring to FIG. 1C, in another example, the optical element 102 may include optical fiber pigtails with connectors or a connected cable stub as shown at 128. In this regard, a length of pigtail 1 (e.g., at 130) may be greater than a length of pigtail 2 (e.g., at 132), for example, by 50 cm, with the additional length being stored around the round drum 134. The fibers at 130 and 132 may be connected to a splice holder 135, and to an adapter panel at 137. Further, the fibers at 130 and 132 may exit the connectors or connected cable stub, for example, at 131 and 133.

Figure 1D:
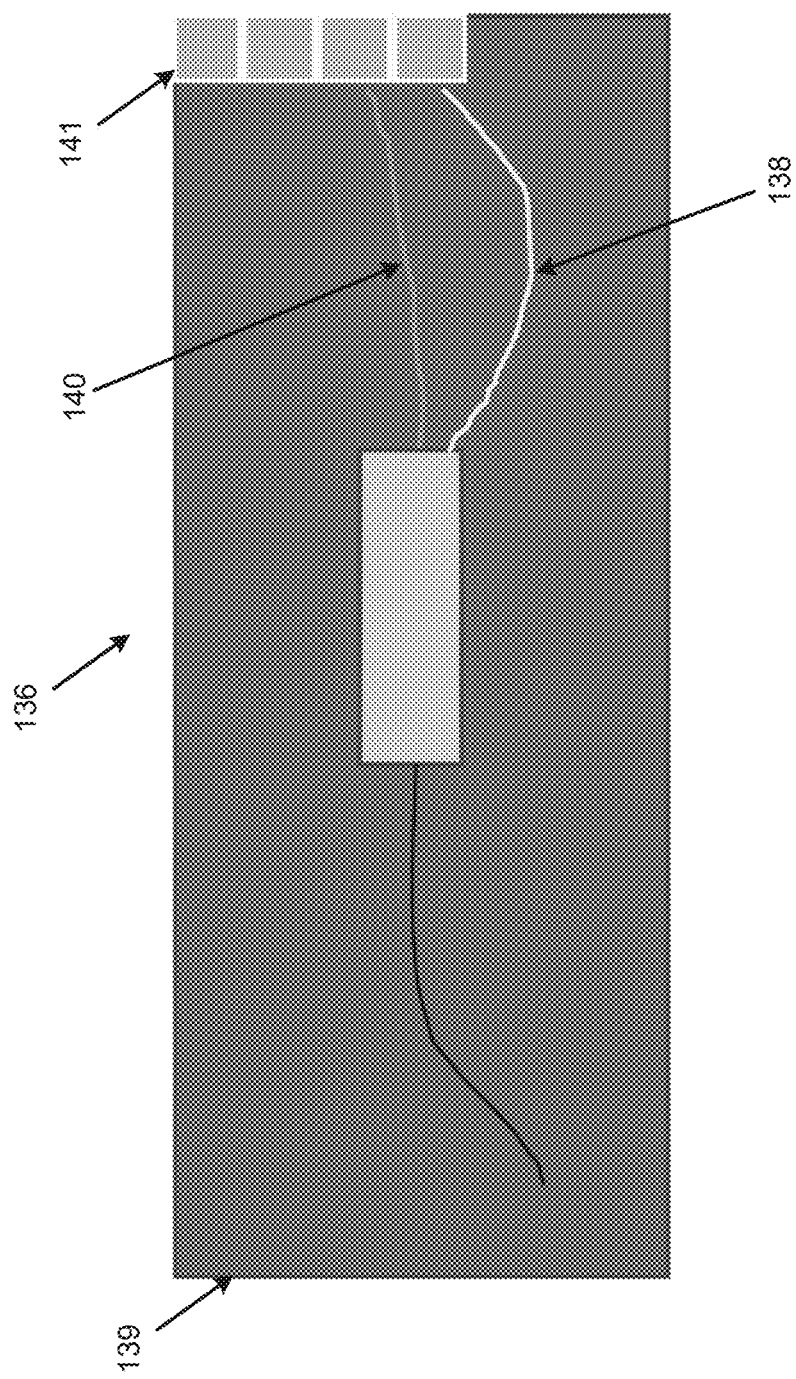

Referring to FIG. 1D, in another example, the optical element 102 may be formed by an optical splitter with connectors as shown at 136. In this regard, a length of splitter out 1 (e.g., at 138) may be greater than a length of splitter out 2 (e.g., at 140), for example, by 50 cm. The fibers at 138 and 140 may be connected to an adapter panel at 141. Further, the fibers at 138 and 140 may exit the optical splitter, for example, at 139.

Figure 1E:
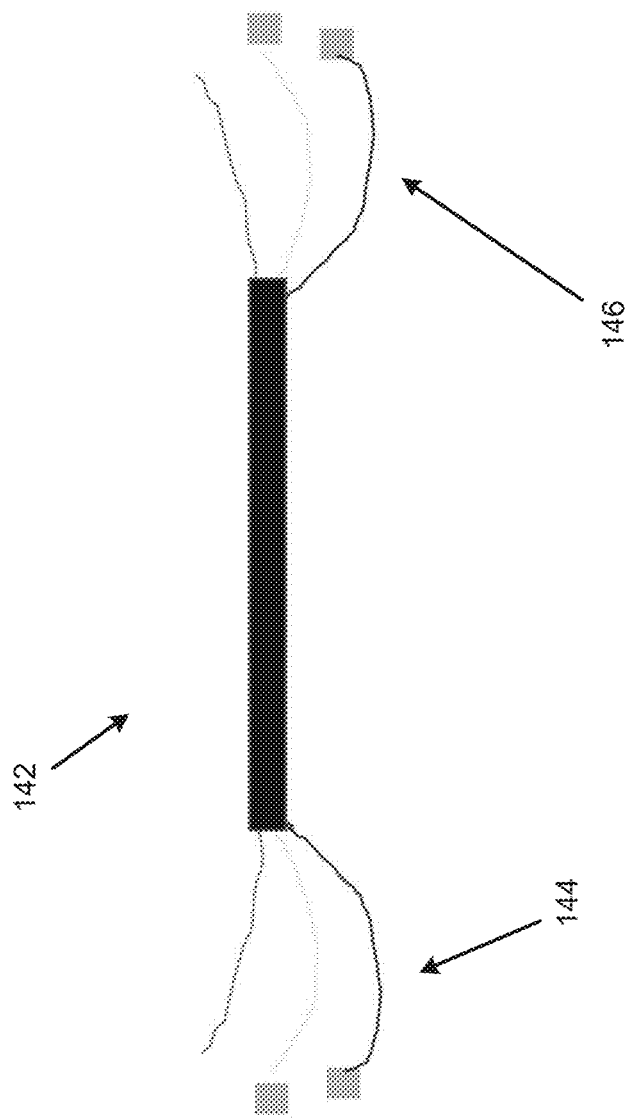

Referring to FIG. 1E, in another example, the optical element 102 may be formed as a test fanout 142 that may be connected and spliced to an optical element output from one side (e.g., at 144), and the other side (e.g., at 146) may have staggered legs and reflector at each leg to create staggered outputs.

Figure 2:
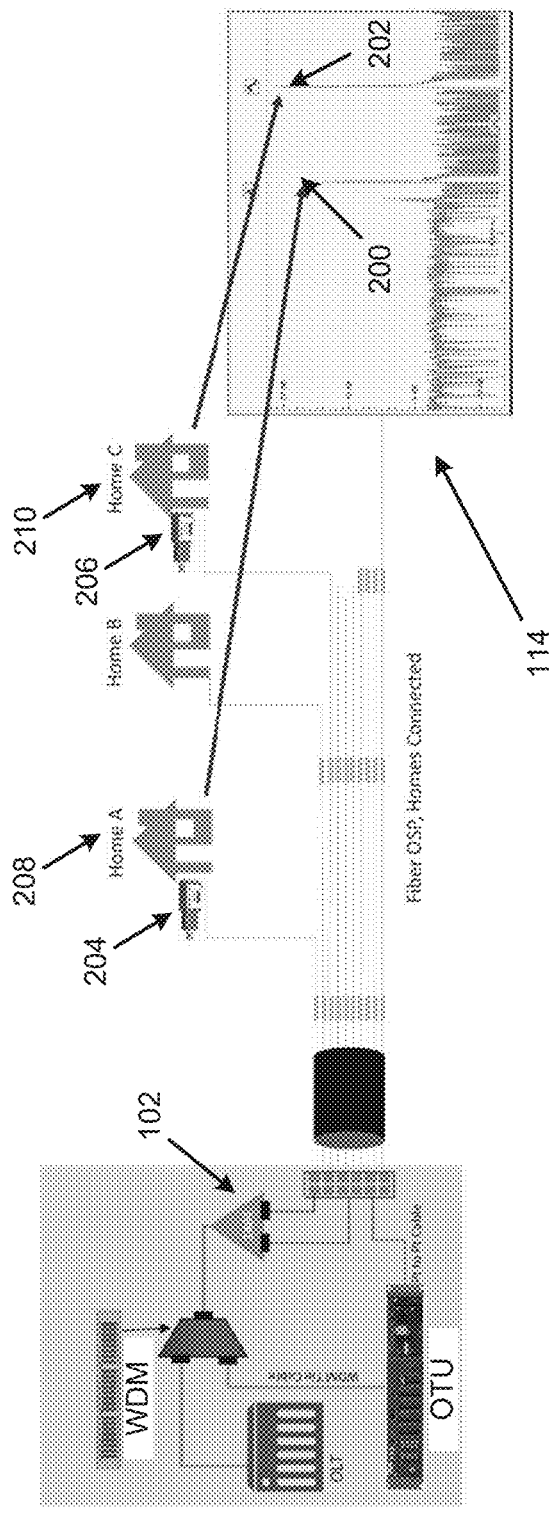
FIG. 2 illustrates further details of the architecture of the fiber element offset length-based optical reflector peak analysis apparatus of FIG. 1A, according to an example of the present disclosure.

FIG. 2 illustrates further details of the architecture of the apparatus 100, according to an example of the present disclosure.

Referring to FIG. 2, the example of FIG. 2 shows an optical distribution network (ODN) construction use case. In this regard, the OTDR trace 114 may be qualified by identifying, in the OTDR trace 114, at least one peak (e.g., peaks 200 and 202) corresponding to the at least one optical reflector. In the example of FIG. 2, the peaks 200 and 202 may correspond to optical reflectors 204 and 206 at home locations 208 and 210, respectively.

Figure 3:
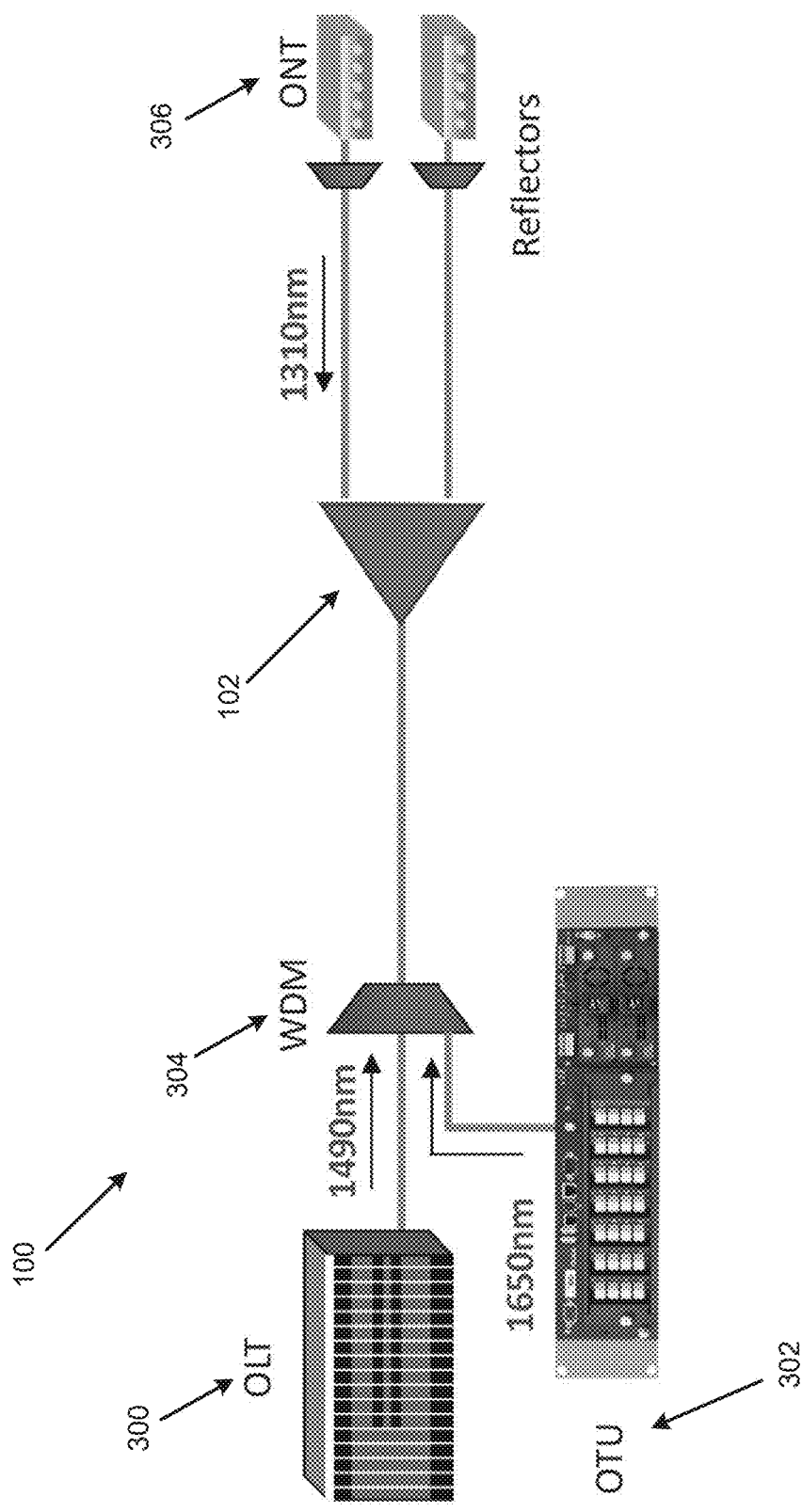
FIG. 3 illustrates further details of the architecture of the fiber element offset length-based optical reflector peak analysis apparatus of FIG. 1A, according to an example of the present disclosure.

FIG. 3 illustrates further details of the architecture of the apparatus 100, according to an example of the present disclosure.

Referring to FIG. 3, an optical line termination (OLT) 300 may inject an optical signal at 1490 nm, and an optical transport unit (OTU) 302 may inject an optical signal at 1650 nm via wavelength-division multiplexer (WDM) 304 into the optical element 102. The OTU 302 may receive return signals, for example, at 1310 nm from optical network terminals (ONTs) 306. Since the ONTs are equidistant from the optical element 102, the pre-set offset for the branches of the optical element 102 provide for qualification of both ONTs based on a single measurement by the OTU 302.

Figure 4:
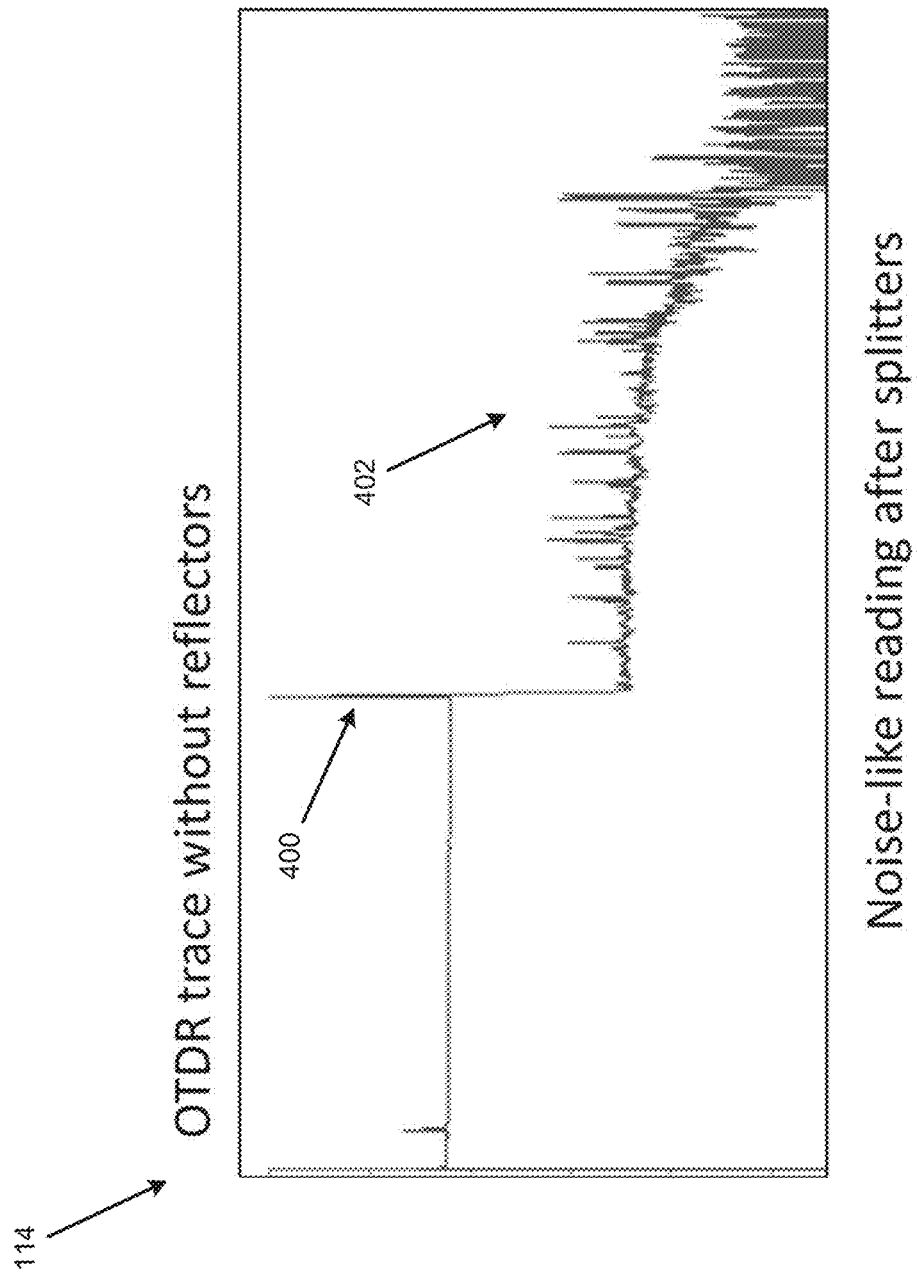
FIG. 4 illustrates an optical time-domain reflectometer (OTDR) trace without reflectors to illustrate operation of the fiber element offset length-based optical reflector peak analysis apparatus of FIG. 1A, according to an example of the present disclosure.

FIG. 4 illustrates an OTDR trace without reflectors to illustrate operation of the apparatus 100, according to an example of the present disclosure.

Referring to FIG. 4, without the optical reflectors 110, the OTDR trace 114 may include a peak at 400 at a splitter, and noise-type readings 402 after splitters.

Figure 5:
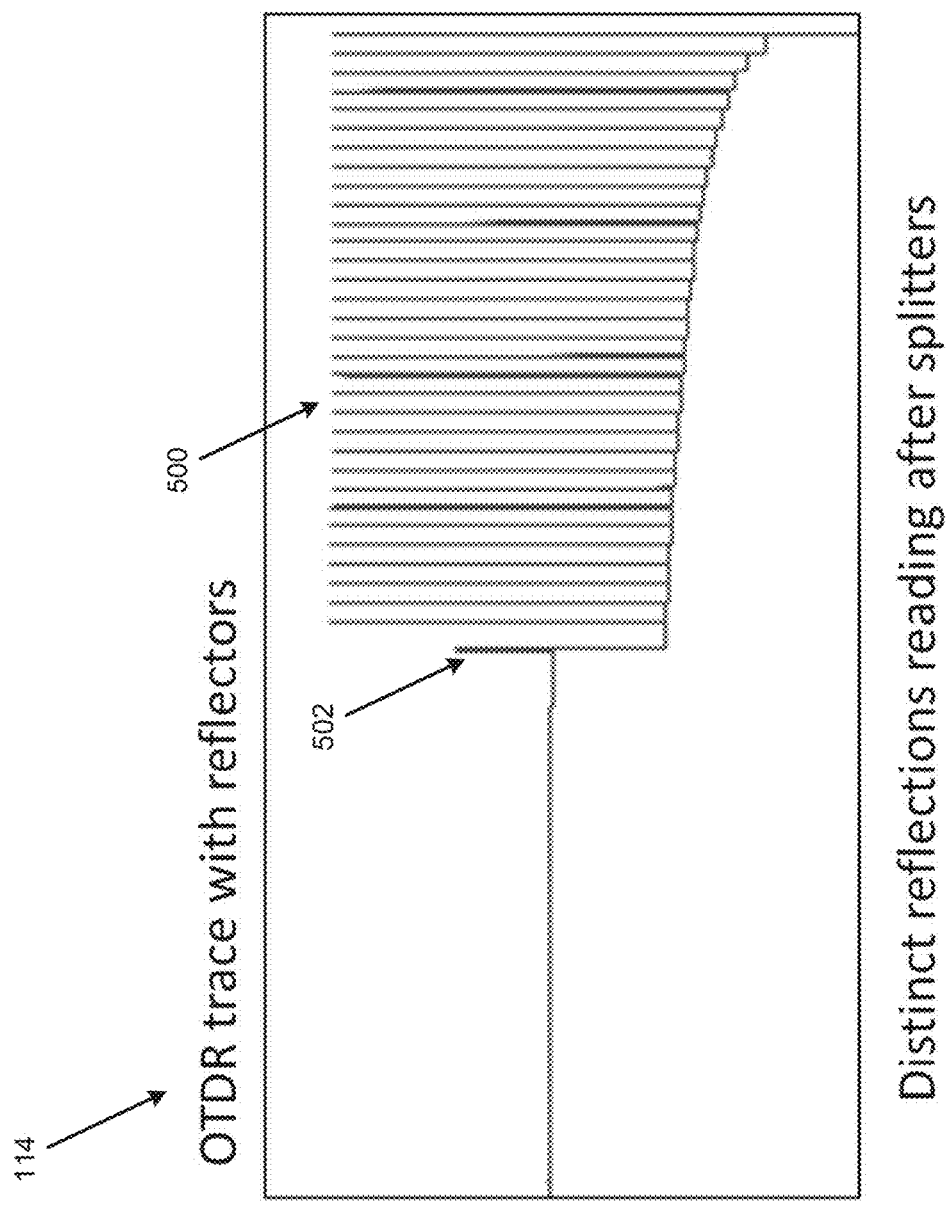
FIG. 5 illustrates an OTDR trace with reflectors to illustrate operation of the fiber element offset length-based optical reflector peak analysis apparatus of FIG. 1A, according to an example of the present disclosure.

FIG. 5 illustrates an OTDR trace with reflectors to illustrate operation of the apparatus 100, according to an example of the present disclosure.

Referring to FIG. 5, compared to FIG. 4, with the optical reflectors 110, the OTDR trace 114 may include distinct reflection readings 500 after splitters (e.g., at 502).

Figure 6:
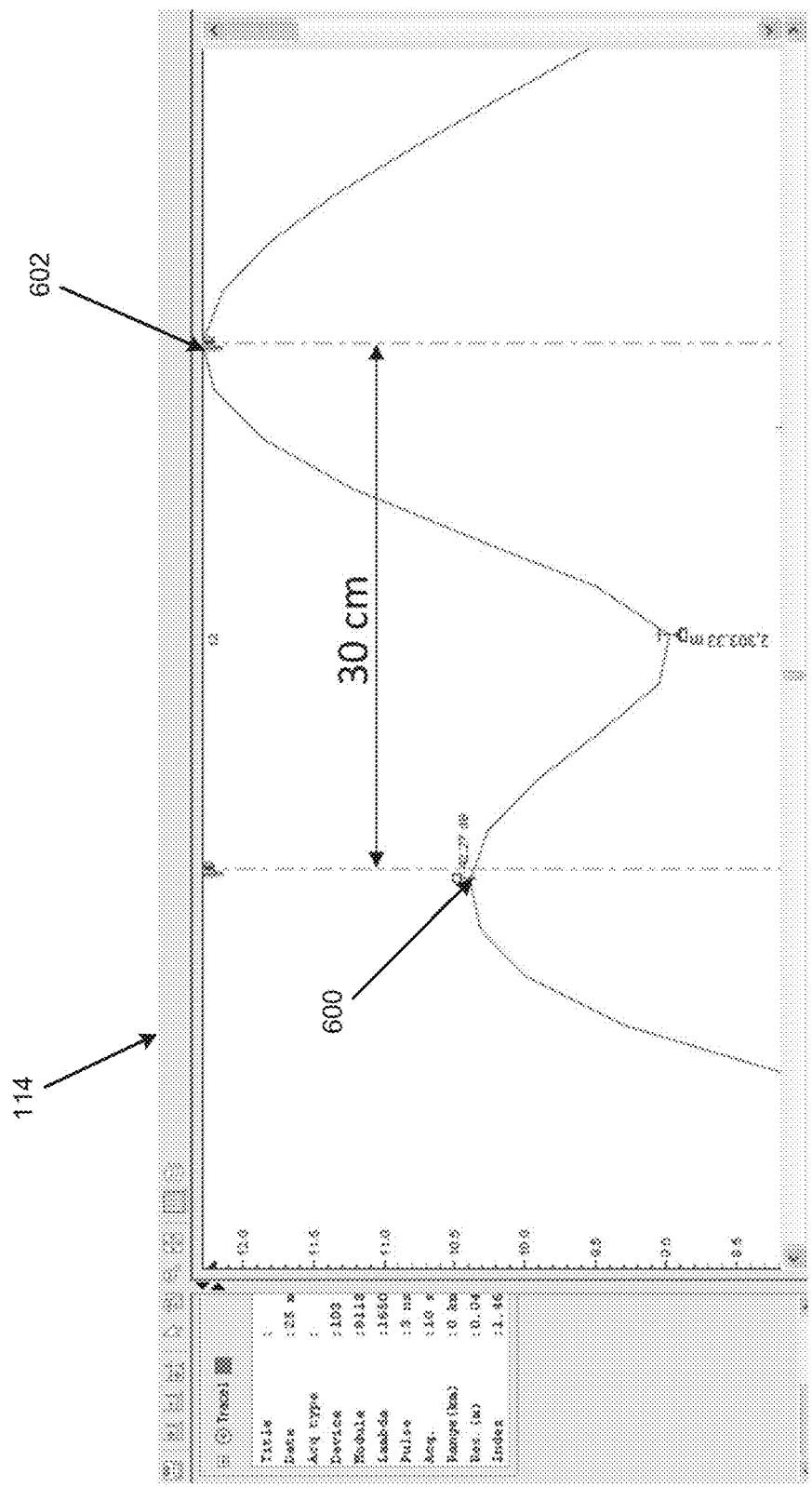
FIG. 6 illustrates an ultra-high resolution (UHR) OTDR trace to illustrate operation of the fiber element offset length-based optical reflector peak analysis apparatus of FIG. 1A, according to an example of the present disclosure.

FIG. 6 illustrates an ultra-high resolution (UHR) OTDR trace to illustrate operation of the apparatus 100, according to an example of the present disclosure.

Referring to FIG. 6, as disclosed herein, the OTDR trace 114 may be qualified by identifying, in the OTDR trace 114, at least one peak (e.g., peaks 600 and 602) corresponding to the at least one optical reflector. In this regard, the number of peaks expected in the OTDR trace 114 may be equal to the number of DUTs 112 (or corresponding optical reflectors). As disclosed herein, the pre-set offset length may be based on a resolution of the OTDR 104. For example, the pre-set offset length may be greater than the resolution of the OTDR 104. For example, assuming that the resolution of the OTDR 104 is 30 cm, in this regard, the preset offset length may be specified at 50 cm.

Figure 7:
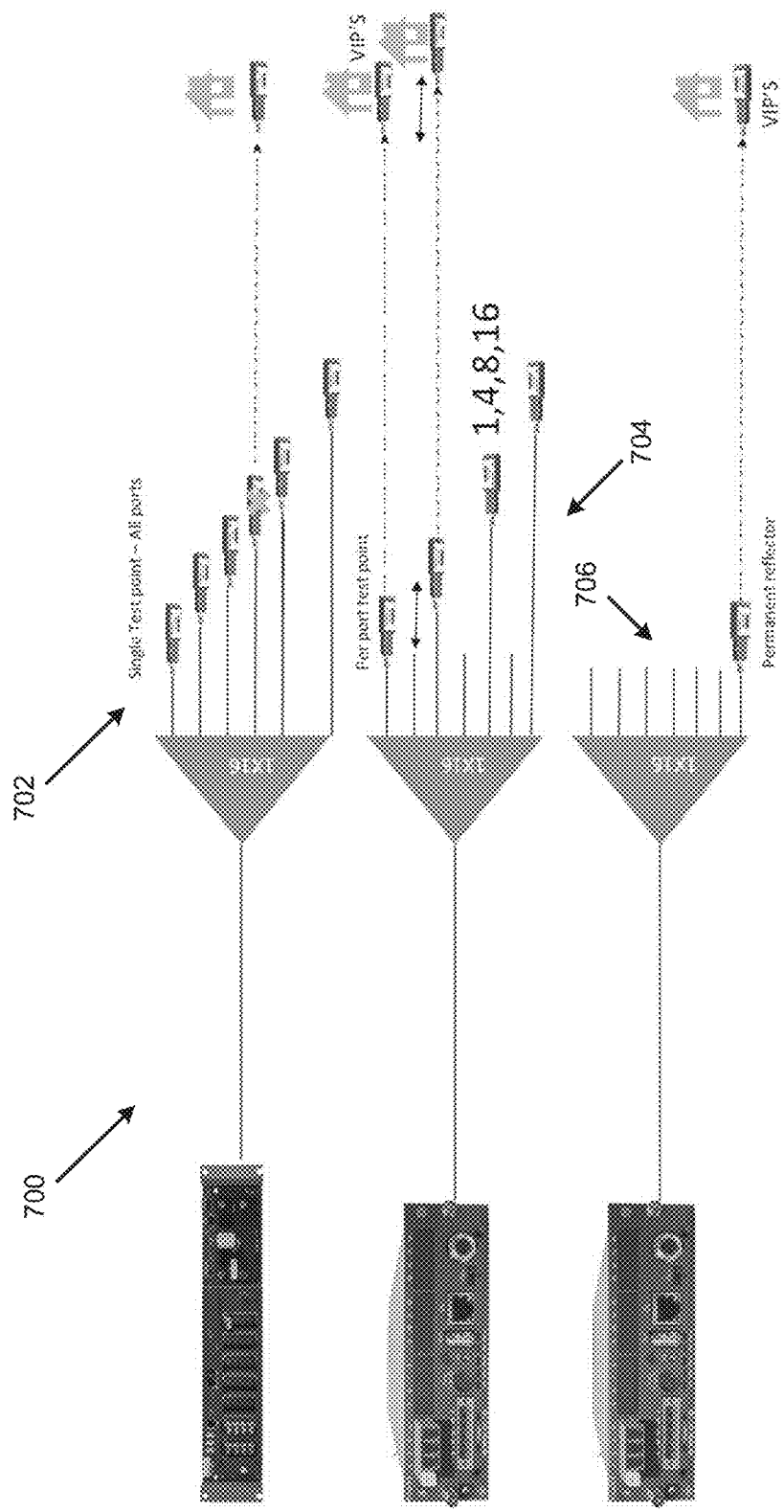
FIG. 7 illustrates different splitter configurations to illustrate operation of the fiber element offset length-based optical reflector peak analysis apparatus of FIG. 1A, according to an example of the present disclosure.

FIG. 7 illustrates different splitter configurations to illustrate operation of the apparatus 100, according to an example of the present disclosure Referring to FIG. 7, at 700, an optical test head may include a reflector on each branch as shown at 702. At 704, optical reflectors 110 may be placed on some of the branches. Further, at 706, an optical reflector may be placed on one of the branches, where the optical reflector may need to be moved to qualify an associated DUT.

Figure 8:
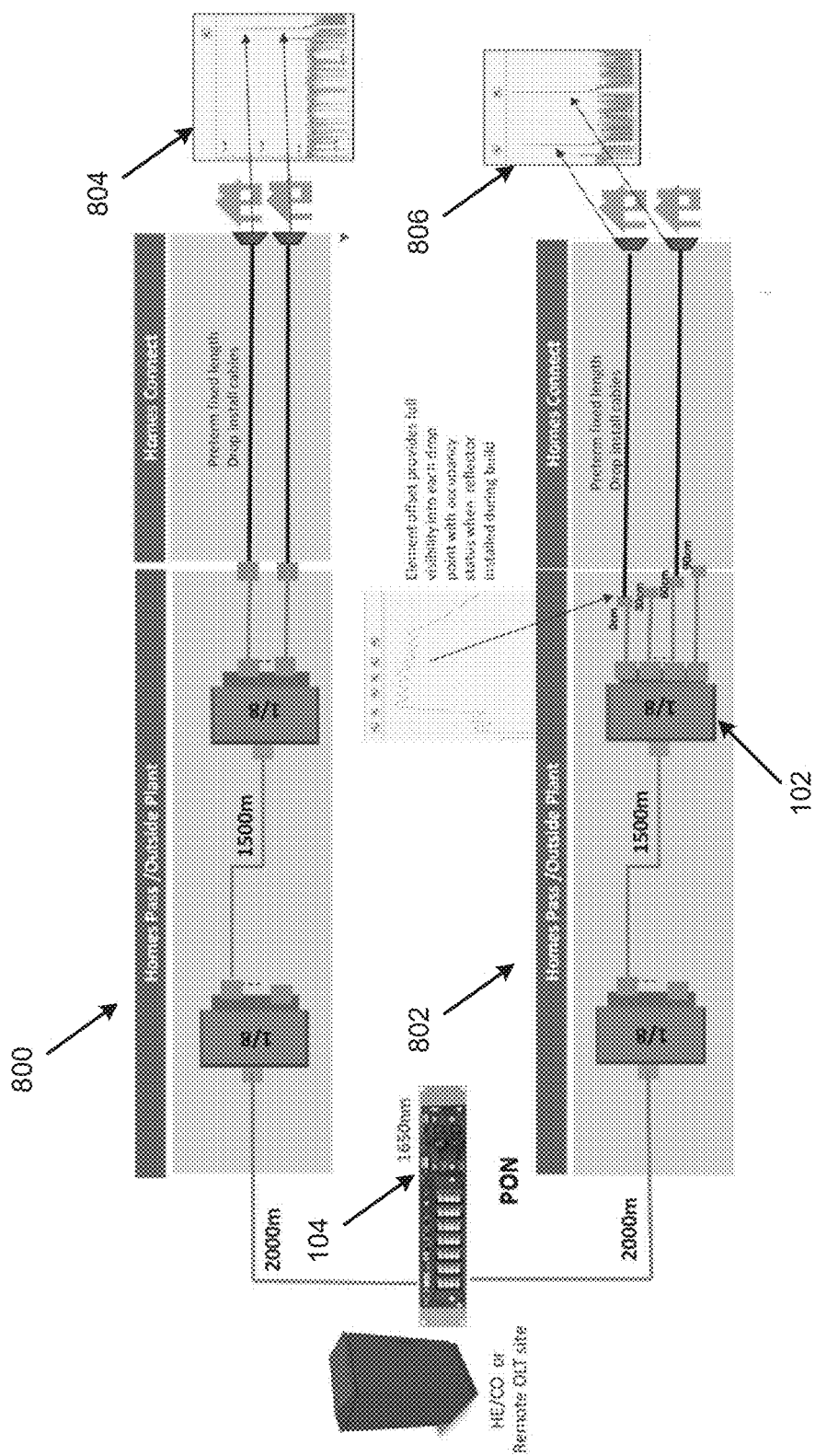
FIG. 8 illustrates further details of the architecture of the fiber element offset length-based optical reflector peak analysis apparatus of FIG. 1A, according to an example of the present disclosure.

FIG. 8 illustrates further details of the architecture of the apparatus 100, according to an example of the present disclosure.

Referring to FIG. 8, for an OTDR 104, a DUT qualification without and with an optical element 102 is respectively shown at 800 and 802. In this regard, the OTDR trace 804 shows that peak reflections coexist at the same distance and cannot be distinguished. Alternatively, the OTDR trace 806 shows that peak reflections can be seen even if reflectors are located equidistant from the optical element 102.

Figure 9:
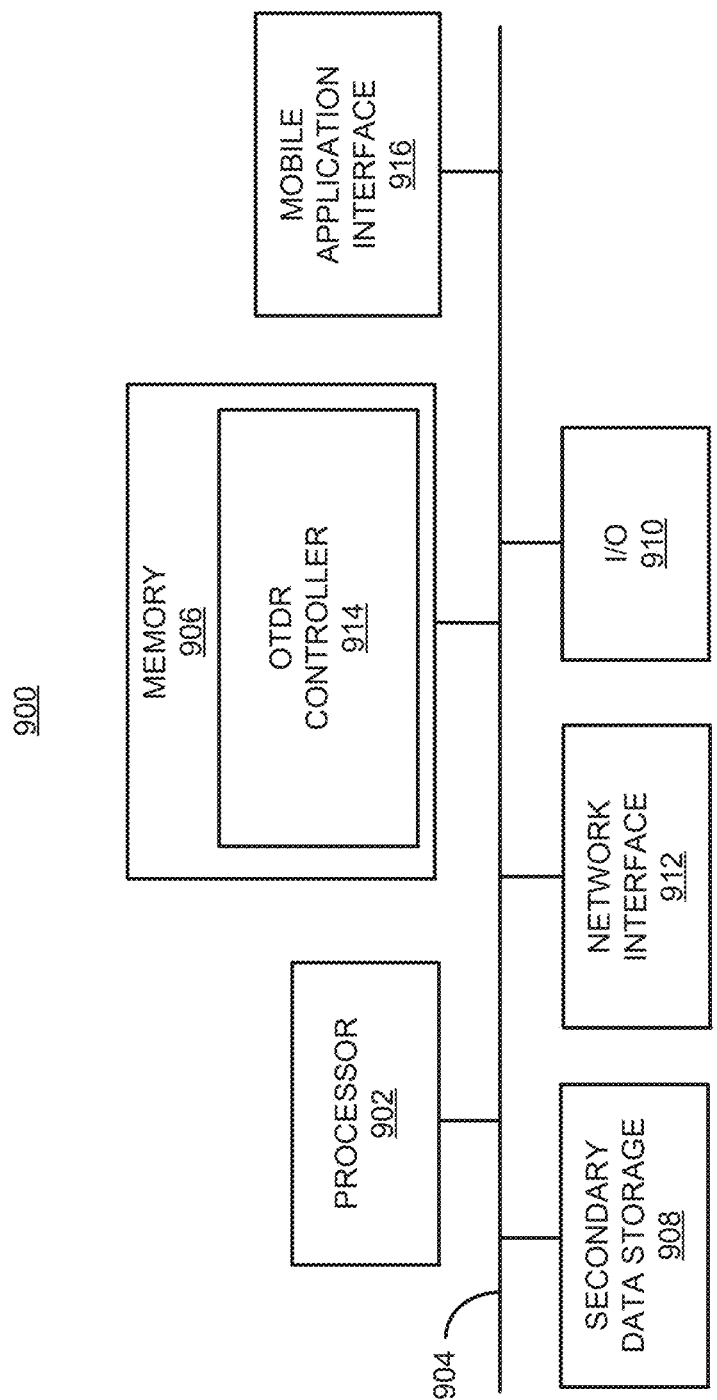
FIG. 9 illustrates a computer system, according to an example of the present disclosure.

FIG. 9 shows a computer system 900 that may be used with the examples described herein. The computer system may represent a generic platform that includes components that may be in a server or another computer system. The computer system 900 may be used as part of a platform for a controller of the OTDR 104 (e.g., OTDR controller 914). The computer system 900 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 900 may include a processor 902 that may implement or execute machine readable instructions performing some or all of the methods, functions and other processes described herein. Commands and data from the processor 902 may be communicated over a communication bus 904. The computer system may also include a main memory 909, such as a random access memory (RAM), where the machine readable instructions and data for the processor 902 may reside during runtime, and a secondary data storage 908, which may be non-volatile and stores machine readable instructions and data. The memory and data storage are examples of computer readable mediums. The memory 906 may include the OTDR controller 914 including machine readable instructions residing in the memory 906 during runtime and executed by the processor 902.

The computer system 900 may include an I/O device 910, such as a keyboard, a mouse, a display, etc. The computer system may include a network interface 912 for connecting to a network. Other known electronic components may be added or substituted in the computer system.

The processor 902 may be designated as a hardware processor. The processor 902 may execute operations associated with various components of the apparatus 100. For example, the processor 902 may execute operations associated with the OTDR controller 914, etc.

The computer system 900 may include a mobile application interface 916 that enables users to control and trigger a measurement process to provide a visual result of the test, and enable peak visualization, identification, association, and re-association.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A fiber element offset length-based optical reflector peak analysis apparatus comprising:
   an optical element optically connected to a laser source that emits a laser beam, wherein the optical element includes a pre-set offset length between a plurality of adjacent branches, wherein the pre-set offset length is based on a resolution of the OTDR; and
   an optical time-domain reflectometer (OTDR) to generate, based on optical reflection signals received from corresponding optical reflectors attached to a plurality of devices under test (DUTs) that are attached to the plurality of adjacent branches, a single OTDR trace that qualifies each of the plurality of DUTs, wherein fiber drop connections to a last termination associated with the plurality of DUTs are equidistant.

2. The fiber element offset length-based optical reflector peak analysis apparatus according to claim 1, wherein the plurality of DUTs include optical fibers.

3. The fiber element offset length-based optical reflector peak analysis apparatus according to claim 1, wherein the pre-set offset length is greater than a resolution of the OTDR.

4. A fiber element offset length-based optical reflector peak analysis apparatus comprising:
   an optical element optically connected to a laser source that emits a laser beam, wherein the optical element includes a pre-set offset length between a plurality of adjacent branches, wherein the pre-set offset length is based on a resolution of the OTDR; and
   an optical time-domain reflectometer (OTDR) to generate, based on at least one optical reflection signal received from at least one corresponding optical reflector attached to at least one device under test (DUT) of a plurality of DUTs that are attached to the plurality of adjacent branches, OTDR trace that qualifies the at least one DUT, wherein fiber drop connections to a last termination associated with the plurality of DUTs are equidistant.

5. The fiber element offset length-based optical reflector peak analysis apparatus according to claim 4, wherein the plurality of DUTs include optical fibers.

6. The fiber element offset length-based optical reflector peak analysis apparatus according to claim 4, wherein the pre-set offset length is greater than a resolution of the OTDR.

7. A method for fiber element offset length-based optical reflector peak analysis comprising:
   optically connecting an optical element to a laser source that emits a laser beam, wherein the optical element includes a pre-set offset length between a plurality of adjacent branches, wherein the pre-set offset length is based on a resolution of the OTDR; and
   generating, by an optical time-domain reflectometer (OTDR), based on at least one optical reflection signal received from at least one corresponding optical reflector attached to at least one device under test (DUT) of a plurality of DUTs that are attached to the plurality of adjacent branches, a single OTDR trace that qualifies the at least one DUT, wherein fiber drop connections to a last termination associated with the plurality of DUTs are equidistant.

8. The method for fiber element offset length-based optical reflector peak analysis according to claim 7, wherein the plurality of DUTs include optical fibers.

9. The method for fiber element offset length-based optical reflector peak analysis according to claim 7, wherein the pre-set offset length is greater than a resolution of the OTDR.

10. The method for fiber element offset length-based optical reflector peak analysis according to claim 7, further comprising:
    qualifying the at least one DUT by identifying, in the OTDR trace, at least one peak corresponding to the at least one corresponding optical reflector.

11. The method for fiber element offset length-based optical reflector peak analysis according to claim 7, further comprising:
    qualifying the at least one DUT for a network that includes a passive optical network (PON).

12. The method for fiber element offset length-based optical reflector peak analysis according to claim 7, further comprising:

qualifying the at least one DUT by identifying the at least one DUT.

13. The method for fiber element offset length-based optical reflector peak analysis according to claim 7, further comprising:
implementing a uniform pre-set offset length between the plurality of adjacent branches.

14. The method for fiber element offset length-based optical reflector peak analysis according to claim 7, further comprising:
implementing a variable pre-set offset length between the plurality of adjacent branches.

15. A fiber element offset length-based optical reflector peak analysis apparatus comprising:
an optical element optically connected to a laser source that emits a laser beam, wherein the optical element includes a pre-set offset length between a plurality of adjacent branches, wherein the pre-set offset length is based on a resolution of the OTDR, and wherein the optical element includes one of:
a splice tray that includes devices under test (DUTs) attached to a plurality of adjacent branches;
a connected cable stub that includes DUT pigtails for the DUTs;
an optical splitter that includes that DUTs; or
a test fanout that includes staggered outputs; and
an optical time-domain reflectometer (OTDR) to generate, based on optical reflection signals received from corresponding optical reflectors attached to the DUTs that are attached to the optical element, a single OTDR trace that qualifies each of the DUTs, wherein fiber drop connections to a last termination associated with the DUTs are equidistant.

16. The fiber element offset length-based optical reflector peak analysis apparatus according to claim 15, wherein the DUTs include optical fibers.

17. The fiber element offset length-based optical reflector peak analysis apparatus according to claim 15, wherein the pre-set offset length is greater than the resolution of the OTDR.

18. The fiber element offset length-based optical reflector peak analysis apparatus according to claim 15, wherein the DUT are qualified via identification of at least one peak associated with the corresponding optical reflectors.

19. The fiber element offset length-based optical reflector peak analysis apparatus according to claim 15, wherein the DUTs are qualified for a passive optical network (PON).

\* \* \* \* \*